United States Patent
Dai et al.

(10) Patent No.: US 7,105,832 B2
(45) Date of Patent: Sep. 12, 2006

(54) COMPOSITE SOLID-STATE SCINTILLATORS FOR NEUTRON DETECTION

(75) Inventors: Sheng Dai, Knoxville, TN (US); Hee-Jung Im, Knoxville, TN (US); Michelle D. Pawel, Oak Ridge, TN (US)

(73) Assignees: UT-Battelle, LLC, Oak Ridge, TN (US); Oak Ridge Associated Universities, Oak Ridge, TN (US); University of Tennessee Research Foundation, Knoxville, TN (US)

( * ) Notice: Subject to any disclaimer, the term of this patent is extended or adjusted under 35 U.S.C. 154(b) by 224 days.

(21) Appl. No.: 10/819,761

(22) Filed: Apr. 7, 2004

(65) Prior Publication Data

US 2005/0224720 A1 Oct. 13, 2005

(51) Int. Cl.
*G01T 1/20* (2006.01)
(52) U.S. Cl. ............................ 250/390.11; 252/600
(58) Field of Classification Search ........... 250/390.11, 250/390.07, 390.01, 269.4, 368; 252/301.17, 252/301.4, 600
See application file for complete search history.

(56) References Cited

U.S. PATENT DOCUMENTS

| | | | |
|---|---|---|---|
| 3,573,218 A | | 3/1971 | Benson |
| 3,999,070 A | * | 12/1976 | Tarkkanen .................. 250/362 |
| 4,124,527 A | * | 11/1978 | Kauffman ................... 436/536 |
| 4,127,499 A | * | 11/1978 | Chen et al. ............ 252/301.17 |
| 4,271,361 A | * | 6/1981 | Jacobs .................... 250/390.01 |
| 4,539,161 A | * | 9/1985 | Guglielmetti ............... 558/390 |
| 4,657,696 A | | 4/1987 | Thomson |
| 4,760,252 A | * | 7/1988 | Albats et al. .......... 250/390.07 |
| 4,795,910 A | * | 1/1989 | Henderson et al. ....... 250/483.1 |
| 5,135,679 A | * | 8/1992 | Mirsky ................... 252/301.17 |
| 5,321,357 A | * | 6/1994 | Maryanski et al. ......... 324/300 |
| 5,336,889 A | * | 8/1994 | Hofstetter ............... 250/361 R |
| 5,410,155 A | * | 4/1995 | Thomson et al. ........... 250/364 |
| 5,680,423 A | * | 10/1997 | Perkins et al. .............. 376/153 |
| 5,783,829 A | * | 7/1998 | Sealock et al. ............ 250/367 |
| 5,973,328 A | * | 10/1999 | Hiller et al. ........... 250/390.01 |

(Continued)

OTHER PUBLICATIONS

Wallace, S., et al., "Neutron Detector Based on Lithiated Sol-Gel Glass, Nuclear Instruments & Methods in Physics Research," 2002, pp. 764-773, A483.
Im, H.E., et al., "Transparent Matrix Structures for Detection of Neutron Particles . . . ," Applied Physics Letters, Mar. 29, 2004, pp. 2448-2450, vol. 84, No. 13.

(Continued)

*Primary Examiner*—David Porta
*Assistant Examiner*—Faye Boosalis
(74) *Attorney, Agent, or Firm*—Joseph A. Marasco; Judson R. Hightower; Shelley L. Stafford

(57) ABSTRACT

Applicant's present invention is a composite scintillator for neutron detection comprising a matrix material fabricated from an inorganic sol-gel precursor solution homogeneously doped with a liquid scintillating material and a neutron absorbing material. The neutron absorbing material yields at least one of an electron, a proton, a triton, an alpha particle or a fission fragment when the neutron absorbing material absorbs a neutron. The composite scintillator further comprises a liquid scintillating material in a self-assembled micelle formation homogeneously doped in the matrix material through the formation of surfactant-silica composites. The scintillating material is provided to scintillate when traversed by at least one of an electron, a proton, a triton, an alpha particle or a fission fragment. The scintillating material is configured such that the matrix material surrounds the micelle formation of the scintillating material. The composite scintillator is fabricated and applied as a thin film on substrate surfaces, a coating on optical fibers or as a glass material.

24 Claims, 4 Drawing Sheets

U.S. PATENT DOCUMENTS

| | | | | |
|---|---|---|---|---|
| 6,107,632 | A * | 8/2000 | Lind | 250/390.01 |
| 6,251,280 | B1 * | 6/2001 | Dai et al. | 210/656 |
| 6,383,815 | B1 * | 5/2002 | Potyrailo | 436/2 |
| 6,475,644 | B1 * | 11/2002 | Hampikian et al. | 428/655 |
| 6,479,829 | B1 * | 11/2002 | Katagiri | 250/484.5 |
| 6,495,837 | B1 * | 12/2002 | Odom et al. | 250/390.11 |
| 6,566,657 | B1 * | 5/2003 | Odom et al. | 250/390.11 |
| 6,855,270 | B1 * | 2/2005 | Mumper et al. | 252/301.17 |
| 2002/0067789 | A1 * | 6/2002 | Wallace et al. | 376/154 |
| 2002/0121604 | A1 * | 9/2002 | Katagiri | 250/368 |
| 2002/0130267 | A1 * | 9/2002 | Odom et al. | 250/390.11 |
| 2003/0160178 | A1 * | 8/2003 | Katagiri | 250/390.11 |
| 2003/0178574 | A1 * | 9/2003 | Wallace et al. | 250/390.11 |
| 2005/0092967 | A1 * | 5/2005 | Rodriguez Barquero et al. | 252/301.17 |
| 2005/0135535 | A1 * | 6/2005 | Wallace | 376/153 |

OTHER PUBLICATIONS

Ghioni, M., et al., "Compact Active Quenching Circuit for Fast Photon . . . ," Rev. Sci. Instrum., Oct. 1996, pp. 3440-3448, vol. 67, No. 10.

Dai, S., et al., "Spectroscopic Investigation of the Photochemistry of Uranyl-Doped Glasses . . . ," Inorg. Chem., 1996, pp. 7786-7790, vol. 35.

Britvich G.I., et al., "Composite Media Based on SiO2-Gels . . . ," State Research Center, Protvino, 1997, pp. 1-4.

Bransome, Jr., E., et al., "The Current Status of Liquid Scintillation Counting," pp. 186-201, Publisher Grune & Stratton, New York, NY.

Ross, H., et al., "Liquid Scintillation Counting and Organic Scintillators," pp. 19-66, Publisher Lewis, Chelsea, Michigan.

Pates, J.M., et al., "The Development of an Alpha/Beta Separation Liquid . . . " J. of Radioanalytical and Nuclear Chem . . . , 1993, pp. 341-348, vol. 172, No. 2.

* cited by examiner

COMPOSITE SOLID-STATE SCINTILLATORS FOR NEUTRON DETECTION

The United States government has rights in this invention pursuant to contract no. DE-AC05-00OR22725 between the United States Department of Energy and UT-Battelle, LLC.

FIELD OF THE INVENTION

The present invention relates to neutron scintillators for neutron detection, and more particularly, to composite solid-state neutron scintillators based on a room temperature sol gel process and micelle self-assembly.

BACKGROUND OF THE INVENTION

Neutrons are uncharged particles that can travel through matter without ionizing the matter. Because neutrons travel through matter in such a manner, neutrons are difficult to detect directly. Some other evidence of a neutron event must be detected in order to determine its existence. An indirect method detects the results of a neutron event and not the neutron event itself.

Neutron radiation is an unequivocal signature of the presence of transuranic elements associated with nuclear power-generated plutonium and enriched uranium and plutonium derived from the disassembly of nuclear weapons. Both passive and active neutron detection methods have been used in such applications, with the latter involving detection of the secondary fission neutrons induced by a brief pulse of neutrons. The prerequisite for neutron scintillators is the presence of neutron absorbing elements, which is not required for the fabrication of other radiation scintillators such as beta and alpha radiations. Favored isotopes for neutron absorption include $^{10}B$, $^{6}Li$, $^{3}He$, and $^{235}U$, all of which have high absorption cross sections for thermal neutrons. In previous work by Wallace et. al. (*Nuclear Instruments and Methods in Physics Research A*, 2002), a surface barrier detector based on sol-gel technology was reported. Then, Im et al. reported in *Applied Physics Letters*, March 2004, an approach to neutron scintillator fabrication that employs a room temperature sol-gel processing.

Industries and geological survey agencies who use or need to detect neutrons are interested in the development of new neutron detectors with advantages in efficiency and versatility over the methods in current use. An improved neutron detector technology could even play a role in national security in screening for insecure fissile weapons materials. Currently, solid-state neutron scintillators such as $^{6}Li$-doped silica glasses and solid mixtures of $^{6}LiF$ and ZnS:Ag are prepared by high-temperature methods. Because of the high temperature employed, these materials are very difficult to integrate as films into electronic devices for neutron detection or to cast as large screens. Furthermore, the high temperature methods eliminate the possibility of using organic scintillators because such organic compounds are seldom stable at elevated temperatures. High tritium counting efficiencies based on different types of liquid scintillating cocktails have been reported; however, these liquid scintillators must be handled carefully and are difficult to secure for field applications due to their tendency to leak. Thus, the development of efficient solid-state scintillating materials, which will significantly enhance general capabilities for in situ monitoring and imaging of radioactive contaminants in the environment, is demanded.

Neutron detection for monitoring the dose of thermal neutrons given to patients receiving boron neutron-capture therapy has used lithium-6 and a cerium activator in a glass fiber (M. Bliss et. al., IEEE Trans. Nucl. Sci., 1995). Hiller et. al., in U.S. Pat. No. 5,973,328, issued on Oct. 26, 1999, improve this technique by allowing a cerium-activated glass fiber to be coated with fissionable elements. A wet chemistry method of placing radioactive fissile elements into glass—which in the vitrified state does not pose a hazard—as described in the '328 patent using sol-gel based technology, is a significant benefit. M. Ghioni et. al. (1996) describe an avalanche photodiode implementation for detecting neutron induced ionization and optical pulse detection.

The '328 device introduced sol-gel techniques unique in the art of neutron detection. Sol-gel chemistry was first discovered in the late 1800s. This area of chemistry has received renewed interest when the process was found to be useful in producing monolithic inorganic gels at low temperatures that could be converted to glasses without a high temperature melting process. Brinker et. al., in 1990, provide a comprehensive explanation of sol-gel chemistry. Sheng Dai et. al., in 1996, provide further detail disclosing uranyl-doped sol-gel glasses.

Emission detectors such as microchannel plates, channeltrons, and avalanche photodiodes are commonly used for detecting ultraviolet (UV) light and fissioned charged particles such as electrons or protons. Microchannel plates are commercially available and well known in the art. Typically, a microchannel plate is formed from lead glass having a uniform porous structure of millions of tiny holes or microchannels. Each microchannel functions as a channel electron multiplier, relatively independent of adjacent channels. A thin metal electrode is vacuum deposited on both the input and output surfaces to electrically connect channels in parallel. Microchannel plates can be assembled in stacked series to enhance gain and performance.

The microchannel plates serve to amplify emissions from fissionable material resulting from the bombardment of neutrons. The amplified signal is then detected and recorded. The signal frequency is proportional to the charged particle emissions, which are proportional to the amount of neutrons bombarding the fissionable material.

Channeltrons operate on the same basic principal of amplifying proportional signals emitted from fissionable materials. A channeltron is a horn-shaped continuous dynode structure that is coated on the inside with an electron emissive material. An ion striking the channeltron creates secondary electrons that have an avalanche effect to create more secondary electrons and finally a current pulse.

Typically, due to the exotic materials and sensitivity of the equipment, the neutron detectors currently available are expensive and difficult to maintain. For example, helium-3 is an extremely rare stable isotope which must be separated at considerable expense from the radioactive gas tritium. Furthermore, the use of a gas absorber results in a slower response time than a solid absorber as disclosed herein. The '328 device thus incorporated fissionable material into a sol-gel composition in combination with an emission detector.

OBJECTS OF THE INVENTION

Accordingly, it is an object of the present invention to provide transparent, crack-free solid state neutron scintillators for neutron detection.

It is another object of the present invention to provide transparent, crack-free solid state neutron scintillators for neutron detection having enhanced efficiencies.

These and other objects, features and advantages of the present invention will become apparent after a review of the following detailed description of the disclosed embodiments and the appended claims.

SUMMARY OF THE INVENTION

In accordance with one aspect of the present invention, the foregoing and other objects are achieved by a composite scintillator for neutron detection comprising a matrix material fabricated from an inorganic sol-gel precursor solution doped with a liquid scintillating material and a neutron absorbing material. The neutron absorbing material yields at least one of an electron, a proton, a triton, an alpha particle or a fission fragment when the neutron absorbing material absorbs a neutron. The liquid scintillating material in a self-assembled micelle formation doped in the matrix material through the formation of surfactant-silica composites. The scintillating material is provided to scintillate when traversed by at least one of an electron, a proton, a triton, an alpha particle or a fission fragment. The scintillating material is configured such that the matrix material surrounds the micelle formation of the scintillating material.

Figure 1:
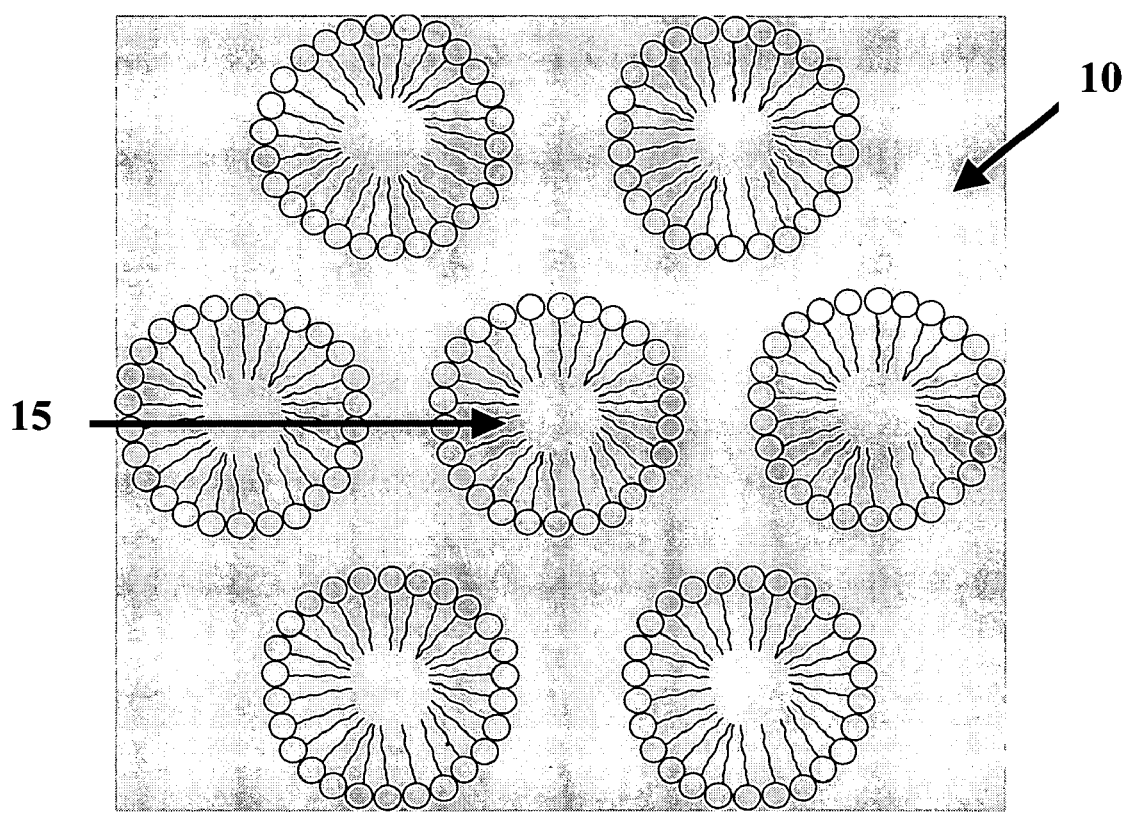
FIG. 1 shows the formation of Applicant's sol-gel composite scintillator based on micelle self-assembly.

For a better understanding of the present invention, together with other and further objects, advantages and capabilities thereof, reference is made to the following disclosure and appended claims in connection with the above-described drawings.

DETAILED DESCRIPTION OF THE INVENTION

Applicant's present invention provides transparent, crack-free, solid-state neutron scintillators including thin-film, glass, and fiber-optic neutron sensors using a room-temperature sol-gel process. The present invention's solid-state neutron sensors are based on the preparation of neutron scintillators using a room-temperature sol-gel process for producing a micelle-$SiO_2$ hybrid gel. Applicant's invention offers a new methodology to greatly enhance fluorescence efficiencies induced by nuclear reactions through co-doping sensitizers and using hybrid hosts. These solid-state lithiated scintillators of the present invention can be easily integrated into electronic detecting devices.

The prerequisite for neutron scintillators is the presence of neutron-absorbing elements, such as lithium-6 (95% $^6Li$ in LiOH), to convert neutrons to detectable charged particles. The neutron scintillator of the present invention is provided for detecting neutrons by absorbing the neutrons, preferably, in a lithium-6 isotope enriched from its natural isotopic ratio to approximately ninety-five percent (95%). When the neutron scintillator of Applicant's invention is bombarded with neutrons, and the neutron absorbing material absorbs a neutron, ions having a high kinetic energy are created. The neutron absorbing material emits or yields at least one of an electron, a proton, a triton, an alpha particle or a fission fragment. As these charged particle reaction products traverse from the matrix material into the scintillating material, they transfer energy to the scintillating material while creating an ionized path. As a result of the ionization path within the scintillating material, a scintillation output is generated. Upon relaxation of the ions into a non-ionized state, photons are emitted. The photons are of a wavelength and duration characteristic of the scintillating material. Emitted photons and/or charged particles can be detected using standard UV and particle detection methods well known in the art, such as a photomultiplier, a silicon photodiode, a charge coupled device, an amorphous silicon screen, a microchannel plate, a channeltron or an avalanche photodiode.

The present invention provides a means for manufacturing room-temperature hybrid gels comprising a neutron absorber/scintillating composite matrix utilizing liquid scintillating micelles having emission properties. Coupling of the lithium-6 to the scintillating micelle material is accomplished as a homogeneous distribution of the lithium-6 within a thin film, glass or fiber which is fabricated using sol-gel chemistry and into which scintillating micelle material is homogeneously embedded or doped. The composite scintillator of Applicant's present invention is useful for generating a signal in the presence of gamma radiation. Specific applications of the material of the present invention include, but are not limited to, monitoring spent nuclear fuel rods and determining fissile mass within remote handle transuranic waste. The material of the present invention is also useful in manufacturing a neutron detector so that a large area is observable for detecting neutrons at a relatively high resolution. The material of the present invention is capable of being replicated in order to provide a relatively large area (square meters) sensitive to neutrons.

In Applicant's present system, the neutron sensors are neutron scintillator sol-gel composites based on micelle self-assembly. It is well known that tetraalkoxysilanes can be readily and homogeneously mixed with surfactants such as polyethylene oxides (PEO) or block copolymers, leading to the formation of surfactant-silica composites or polyether-silica composites if PEO or block copolymers are used. Cationic surfactants can also be used for the formation of cation-silica composites. The polyethylene oxides that can be used for Applicant's composite scintillators include at least one of poly(ethylene glycol)-block-poly(propylene glycol)-block-polyethylene glycols, ethoxylated alkylphenols or alkyl poly(ethylene oxide) oligomeric surfactants. Block copolymers that can be used include poly(styrene-b-ethylene oxide). Cationic surfactants that can be used include quaternary ammonium surfactants and alkylamine surfactants. The polyether-silica and cation-silica composites have strong physical properties and have great promise for dissolving lithium-6 salts through the solvation of lithium cations by the respective surfactants (either the polyethylene oxides, block copolymers or the cationic surfactants), silica or both. During experimentation, the most critical element to success of Applicant's system was finding the appropriate conditions at which organic fluors, PPO (2,5-diphenyloxazole) and POPOP (1,4-bis-2-(5-phenyloxazolyl)-benzene), are highly soluble in the lithiated inorganic sol-gels without great detriment to the scintillator's transparency and light emission intensity. Organic fluors were homogeneously co-doped in the lithiated surfactant-silica gel through a micelle system. For this purpose, at least one of nonionic surfactants and anionic surfactants (such as R-succinates, R-carboxylates, R-sulfonates, R-sulphates or R-phosphates, where R=alkyl, ethoxylated alkyl, and ethoxylated aryl) was used to solubilize organic fluors, which were dissolved in organic solvent of di-isopropyl-naphthalene. Other organic solvents that can be used include 1-phenyldodecante or 2-ethyinaphthalene. Nonionic surfactants that can be used include ethoxylated alkylphenols (such as polyoxyethylene(5)nonylphenyl ether), di(ethylene glycol)butyl ethers and fatty alcoholethoxylates. The use of anionic surfactants is optional depending on the type of scintillator being fabricated. Organic fluors that can be used include one of the following combinations: PPO/POPOP, p-terphenyl/POPOP or 1,1,4,4-tetraphenylbutadiene. These water-soluble liquid scintillators can not only be homogeneously mixed into lithiated surfactant-silica matrix, but can also reduce the quenching problems resulting from —OH and other polar groups associated with the sol-gels. In Applicant's system, PPO functions as an activator and POPOP functions as the wavelength shifter in the present scintillators. The energy from the neutron-capture reaction of $^6$Li, ($^6$Li+$^1$n→$^3$H+$^4$He($\alpha$)+4.79 MeV), was expected to deposit in the scintillator, resulting in fluorescent emission of photons from PPO and POPOP.

The sol-gel process is a well-known and versatile solution process for making thin-film, glass, fiber-optic materials, as well as other materials. In general, the sol-gel process involves the transition of a system from a mostly colloidal liquid sol into a solid gel phase. The sol-gel processing is a low-temperature process requiring little or no heating. The gel can be doped with molecules having poor thermal stabilities which preclude their incorporation in traditional inorganic hosts. Such molecules become entrapped in the growing covalent gel network rather than being chemically bound to the inorganic matrix. By trapping suitable analytical reagents, sol-gel glasses have been used for the preparation of a wide variety of chemical-sensing materials, optical materials and sorbents.

The precursor or starting materials used in the preparation of the sol are usually inorganic metal salts or metal organic compounds such as metal alkoxides. In a typical sol-gel process, the precursor is subjected to a series of hydrolysis and polymerization reactions to form a colloidal suspension or a sol. Further processing of the sol enables the preparation of materials in different forms. For instance, thin films can be produced on a substrate by spin-coating or dip-coating Applicant's micelle-SiO$_2$ hybrid gel onto the substrate. Optical fibers such as wavelength shifting fiber-optics can also be produced from Applicant's sol by adjusting its viscosity into a proper viscosity range then coating the optical fibers with Applicant's micelle-SiO$_2$ hybrid gel. The surfaces of various electronic and optical devices can also be coated with Applicant's micelle-SiO$_2$ hybrid gel. In addition, when Applicant's sol is cast into a mold, a wet gel forms. With further drying and heat-treatment, the gel is converted into dense ceramic or glass material. If the liquid in a wet gel is removed under supercritical conditions, an aerogel is formed which is a highly porous and extremely low density material. If a wet gel undergoes evaporation of the liquid by drying the gel by means of low temperature treatments (25–100° C.), a porous, solid material is formed called a xerogel. Since the sol-gel process is a room-temperature process, it provides a versatile, inexpensive system that is compatible with inorganic and organic dopants for hybrid material processing.

Applicant's present invention is a new type of solid-state neutron scintillator for neutron detection comprising an inorganic matrix material homogeneously doped with a neutron absorbing material; and further comprising a liquid scintillator material wherein the organic fluor, PPO/POPOP, is solubilized in a surfactant solution forming a micelle organic phase which is homogeneously doped into the transparent inorganic silica gel matrix. The neutron absorbing material for Applicant's invention includes at least one element selected from the group consisting of Li-6, B-10, Gd, U-233, U-234, U-235, U-236, U-238, Np-237, Pu-239, Pu-240, Th-232 and Am-241. FIG. 1 illustrates Applicant's neutron scintillator wherein 10 is the inorganic matrix material and 15 is the organic phase scintillator material with the organic fluor in the form of a micelle. These neutron scintillators emit blue light ($\lambda_{em}$=413 nm) at 340 nm excitation which is matched to the sensitivity of the photomultiplier tube. Additionally, with only 0.1 weight % $^6$Li$^+$-doping, these neutron scintillators show great response toward neutron radiation as can be demonstrated in a comparative investigation of pulse height spectra. The neutron efficiencies can be increased with increasing the weight % of $^6$Li$^+$ doping.

EXAMPLE 1

The liquid scintillator was prepared separately by dissolving a nonionic surfactant (polyoxyethylene(5)nonylphenyl ether, Aldrich) (14 wt. %) and anionic surfactants (14 wt. % bis(2-ethylhexyl)hydrogen phosphate, 97%, Aldrich; (1 wt. %) sodium di-octylsulphosuccinate, 99.8%, Aldrich; and (1 wt. %) triethyl phosphate, 98% Aldrich) and PPO (1~2 wt. %) (2,5-diphenyloxazole, Rip Corp. Scintillation grade)/POPOP (0.01~0.02 wt. %) (1,4-bis-2-(5-phenyloxazolyl)-benzene, Packed Instrument Company, Scintillation grade) into diisopropylnaphthalene (68 wt. %) (Ruetasolv DI, >98% Rutgers Krueha Solvents GmbH) via a micelle system. $^6$LiCl was also prepared by dissolving 1.000 g of $^6$LiOH (95%, obtained from Y-12, BWXT, through ORNL Isotope Sales (also commercially available)) in deionized water with 2.7 ml concentrated HCl (12.2 M, EM Science). Volatiles were removed from the clean colorless solution under vacuum, and the pH was checked to verify neutrality.

A series of samples was prepared as follows: 400 mg of P123® (poly(ethylene glycol)-block-poly(propylene glycol)-block-polyethylene glycol), Ave. Mn 5,800, Aldrich) was dissolved in 2 mL of ethyl alcohol (Absolute 200 proof, Aaper alcohol and chemical co.), and various amounts of $^6$LiCl (10, 20, 40, 80 and 120 mg respectively) with 280 μL liquid scintillator were mixed into the solution. Then, 832 μL of cross-linking reagent (tetraethyl orthosilicate (TEOS), 99%, Gelest; 1,4-bis(triethoxysilyl)-benzene), 96%, Gelest; or bis(triethoxysilyl)ethane, Gelest) was added to each solution. Sonication was applied for about 10 minutes, to initiate sol-gel polymerization. After the solutions were aged at room temperature, these homogeneous viscous gel solutions were coated as thick films on a variety of matrixes such as quartz disks, polyethylene plates, and wavelength shifting fibers. Monoliths were also prepared by curing the viscous gel solutions in one-inch diameter glass bottles without covers for several days. These monoliths detached from the bottle upon drying without cracking.

Instrumentation was assembled for comparing pulse-height spectra from the different experimental scintillator samples. The pulse-height analysis system consisted of a one-inch-diameter PMT (Hamamatsu R1924A, with E2924-500 socket assembly, custom-built housing), followed by amplifiers (Ortec 113 preamplifier and 575A shaping main amplifier) and a computer-interfaced multichannel analyzer (Spectrum Techniques UCS-20). The electronics were interconnected with 93Ω and 52Ω coaxial cables as appropriate; the preamplifier and PMT assembly were given long cables so they could be located remotely at a neutron source while work was done on the computer. A 4.7kΩ resistor was installed across the preamplifier input since the PMT socket assembly lacked an anode load resistor as supplied. A double-layer film-handling bag surrounded the PMT assembly to maintain light-tight conditions while facilitating rapid exchange of the scintillator samples being tested. The MCA conversion gain was set at 256 channels.

Figure 2:
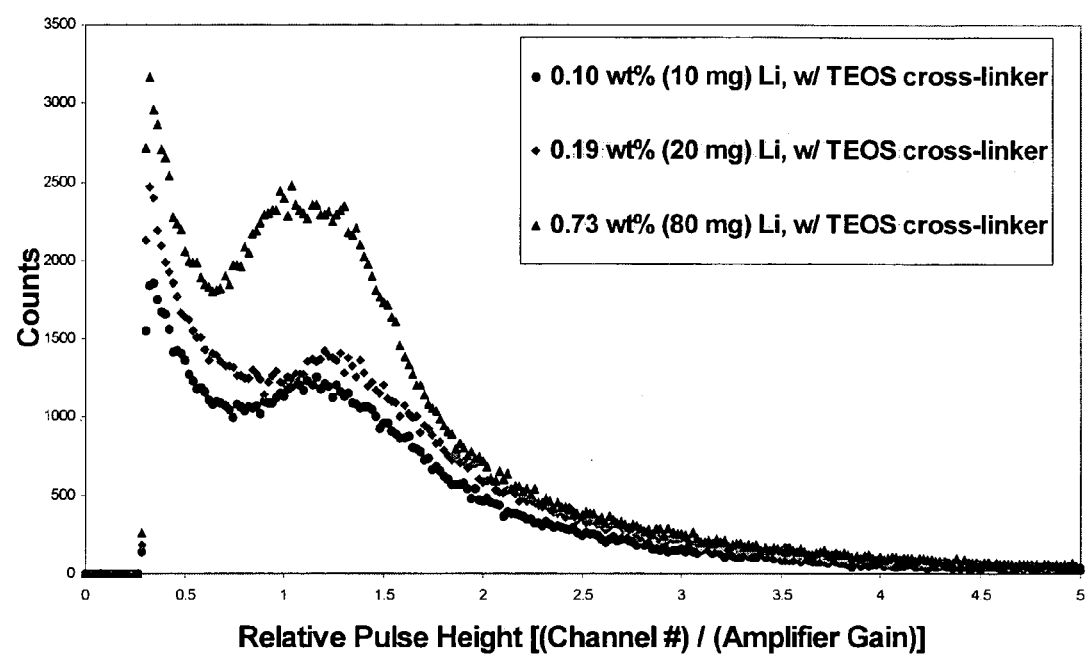
FIG. 2 is a series of neutron pulse height spectra of Applicant's micelle-$SiO_2$ hybrid lithiated gel.
Figure 3:
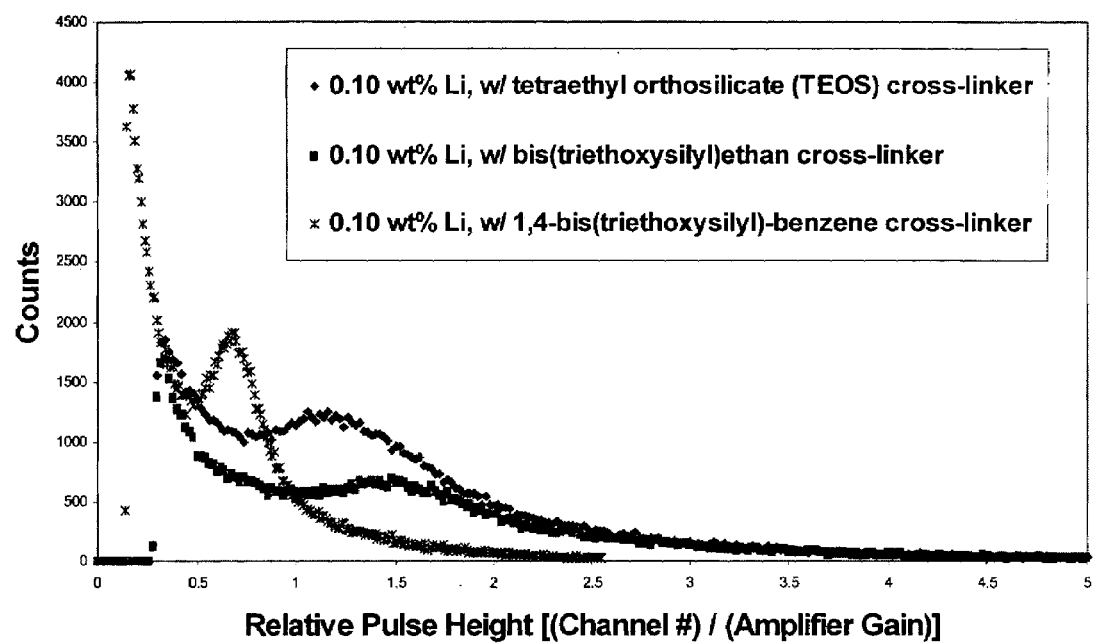
FIG. 3 is a series of neutron pulse height spectra of Applicant's micelle-$SiO_2$ hybrid lithiated gel.

The procedure for neutron measurements involved placing the detector near a neutron source storage drum. Measurements for samples were done with a 3 Ci AmBe neutron source and a 3 mCi $^{252}$Cf spontaneous fission neutron source that were housed in 55-gallon drums. The drums contained a thick neutron moderator/absorber shield, and thus it was assumed that thermal neutrons predominate in the energy distribution outside the drum. The detector and PMT were shielded from fission gamma radiation by 5 cm lead bricks, and an additional 3 cm of high-density polyethylene moderator was interposed between the bricks and the source drum. Pulse-height spectra were accumulated over $1.5 \times 10^4$ seconds for each neutron detector sample (see FIG. 2 and FIG. 3).

After collection, the pulse-height spectra were analyzed with the MCA software supplied by Spectrum Techniques. Peak centroid channel, full-width-at-half-maximum (FWHM) and net and gross peak areas were obtained. The gain setting of the shaping main amplifier was also recorded for each test.

Figure 4:
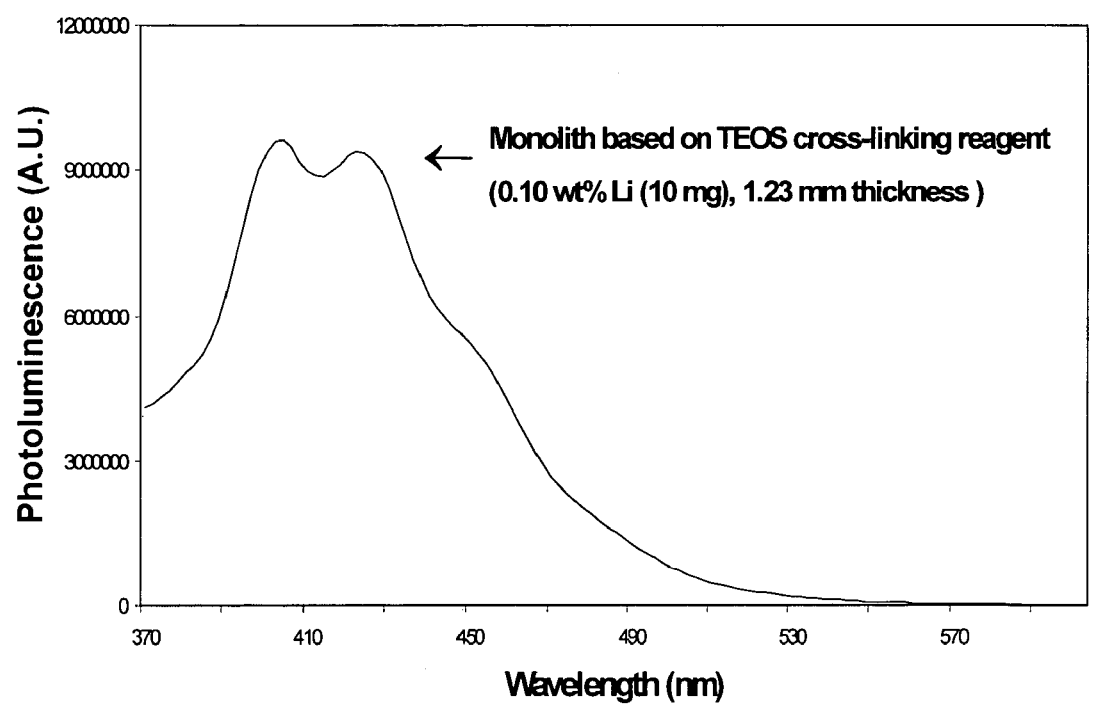
FIG. 4 is a fluorescence spectrum of Applicant's micelle-$SiO_2$ hybrid lithiated gel with excitation at 340 nm.

Fluorescence emission and excitation spectra were recorded on a SPEX Fluorolog spectrofluorometer Model FL3-22, equipped with double-grating monochromators and a 450 W xenon lamp as an excitation source. The fluorescence spectra of the samples were obtained by UV excitation at 340 nm., see FIG. 4. Emission spectra were corrected for the sensitivity of the PMT and excitation spectra were corrected for the intensity of the xenon lamp.

While there has been shown and described what are at present considered the preferred embodiments of the invention, it will be obvious to those skilled in the art that various changes and modifications can be made therein without departing from the scope of the invention defined by the appended claims.

What is claimed is:

1. A composite scintillator for neutron detection comprising:
   a) a matrix material fabricated from an inorganic sol-gel precursor solution homogeneously doped with a liquid scintillating material and homogeneously doped with a neutron absorbing material, said neutron absorbing material yielding at least one of an electron, a proton, a triton, an alpha particle or a fission fragment when said neutron absorbing material absorbs a neutron; and
   b) said liquid scintillating material in a self-assembled micelle formation doped in said matrix material through the formation of surfactant-silica composites, said scintillating material being provided to scintillate when traversed by said at least one of an electron, a proton, a triton, an alpha particle or a fission fragment, said scintillating material being configured such that said matrix material surrounds said micelle formation of said scintillating material.

2. The composite scintillator of claim 1 wherein said neutron absorbing material includes at least one element selected from the group consisting of Li-6, B-10, Gd, U-233, U-234, U-235, U-236, U-238, Np-237, Pu-239, Pu-240, Th-232 and Am-241.

3. The composite scintillator of claim 1 wherein said surfactant-silica composites are polyether-silica composites formed using polyethylene oxides or block copolymers.

4. The composite scintillator of claim 3 wherein said polyethylene oxides include at least one of poly(ethylene glycol)-block-poly(propylene glycol)-blook-polyethylene glycols, ethoxylated alkylphenols and alkyl poly(ethylene oxide) oligomeric surfactants.

5. The composite scintillator of claim 3 wherein said block copolymers include poly(styrene-b-ethylene oxide).

6. The composite scintillator of claim 1 wherein said surfactant-silica composites are cation-silica composites formed using cationic surfactants.

7. The composite scintillator of claim 4 wherein said cationic surfactants include quaternary ammonium surfactants and alkylamine surfactants.

8. The composite scintillator of claim 1 being fabricated by homogeneously mixing said liquid scintillating material into a sol-gel precursor solution doped with a neutron absorbing material then being polymerized at room temperature.

9. The composite scintillator of claim 1 wherein said liquid scintillating material comprises at least one nonionic surfactant and further comprises organic fluors in an organic solvent wherein said organic fluors are solubilized into a silica matrix by said nonionic surfactants forming a water-soluble phase in a self-assembled micelle.

10. The composite scintillator of claim 9 wherein said nonionic surfactants include ethoxylated alkylphenols, di(ethylene glycol) butyl ethers and fatty alcoholethoxylates.

11. The composite scintillator of claim 10 wherein said ethoxylated alkylphenols include polyoxyethylene(5)nonylphenyl ethers.

12. The composite scintillator of claim 9 further comprising at least one anionic surfactant.

13. The composite scintillator of claim 12 wherein said anionic surfactant includes R-succinates, R-carboxylates, R-sulfonates, R-sulphates, or R-phosphates, wherein R is alkyl, ethoxylated alkyl, and ethoxylated aryl.

14. The composite scintillator of claim 9 wherein said organic fluors include PPO (2,5-diphenyloxazole)/POPOP (1,4-bis-2-(5-phenyloxazolyl)-benzene), P-terphenyl/POPOP, 1,1,4,4-tetraphenylbutadiene.

15. The composite scintillator of claim 9 wherein said organic solvent is diisopropylnaphthalene, 1-phenyldodecane or 2-ethyinaphthalene.

16. The composite scintillator of claim 1 wherein said composite scintillator is fabricated and applied as a coating to a surface substrate.

17. The composite scintillator of claim 16 wherein said surface substrate includes optical fibers.

18. The composite scintillator of claim 17 wherein said optical fibers are wavelength shifting fibers.

19. The composite scintillator of claim 16 wherein said surface substrate is a surface viewable by an optical emission detecting element to image neutrons.

20. The composite scintillator of claim 16 wherein said surface substrate is an optically clear disk placed in optical communication with a detector.

21. The composite scintillator of claim 1 being positioned relative to at least one detector element sensitive to scintillation light, whereby said detector element produces an electrical signal upon detection of scintillation light resulting from neutron absorption by said neutron absorbing material.

22. The composite scintillator of claim 21 wherein said detector element is selected from the group consisting of a photomultiplier, a silicon photodiode, a charge coupled device, an amorphous silicon screen, a microchannel plate, a channeltron and an avalanche photodiode.

23. The composite scintillator of claim 21 wherein said composite scintillator is coupled to a wavelength shifting fiber wherein said scintillator light occurring within a volume of said composite scintillator is transformed and guided within said wavelength shifting fiber to a detection element of a multianode photomultiplier tube.

24. The composite scintillator of claim 21 wherein said composite scintillator is coupled to a wavelength shifting fiber wherein said scintillator light occurring within a volume of said composite scintillator is transformed and guided within said wavelength shifting fiber to a detection element of an array of avalanche photodiodes.

* * * * *